(12) United States Patent
Smirnov et al.

(10) Patent No.: US 10,146,644 B2
(45) Date of Patent: Dec. 4, 2018

(54) INTEGRITY OF TRANSACTIONAL MEMORY OF CARD COMPUTING DEVICES IN CASE OF CARD TEAR EVENTS

(71) Applicant: Oracle International Corporation, Redwood Shores, CA (US)

(72) Inventors: Mikhail Aleksandrovich Smirnov, Fremont, CA (US); Kari Okamoto, Santa Clara, CA (US); Johnny Le, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 119 days.

(21) Appl. No.: 15/183,830

(22) Filed: Jun. 16, 2016

(65) Prior Publication Data
US 2017/0364418 A1    Dec. 21, 2017

(51) Int. Cl.
*G06F 11/00* (2006.01)
*G06F 11/14* (2006.01)
*G06F 11/10* (2006.01)

(52) U.S. Cl.
CPC ...... *G06F 11/1471* (2013.01); *G06F 11/1004* (2013.01); *G06F 11/1076* (2013.01); *G06F 11/1474* (2013.01)

(58) Field of Classification Search
CPC ............ G06F 11/1471; G06F 11/1004; G06F 2201/805; G06F 11/1076; G06F 11/1474
USPC ........................................................ 714/6.2
See application file for complete search history.

(56) References Cited

U.S. PATENT DOCUMENTS

| 5,715,431 A | 2/1998 | Everett et al. |
| 6,272,607 B1 | 8/2001 | Baentsch et al. |
| 6,324,661 B1 | 11/2001 | Gerbault et al. |
| 6,535,997 B1 | 3/2003 | Janson et al. |

(Continued)

FOREIGN PATENT DOCUMENTS

EP    1510924 A1    3/2005

OTHER PUBLICATIONS

Vyas, R. K., et al. "Use of Applets for Java Cards Technology for Smart Cards", International Journal of Advanced Research in Computer Science and Software Engineering, Dec. 2011, 5 pages.

(Continued)

*Primary Examiner* — Yair Leibovich
(74) *Attorney, Agent, or Firm* — Fish IP Law, LLP (57) ABSTRACT

A method may include copying transaction rollback data to a buffer in a first memory. The method may further include calculating a checksum for the transaction rollback data, and storing the calculated checksum and a checksum pointer in the first memory. The checksum pointer may refer to a last valid location in a transactional memory region of the second memory for which the checksum is calculated. The method may further include writing, to the transactional memory region, the transaction rollback data from the buffer and the checksum and the checksum pointer from the first memory, and performing at least part of the transaction by writing new transaction data to the heap. The transaction rollback data may be useable to restore the heap to a state prior to initiating the transaction if the transaction was incomplete, upon reconnecting the card computing device after determining that a card tear event has occurred.

18 Claims, 7 Drawing Sheets

(56) References Cited

U.S. PATENT DOCUMENTS

| | | | |
|---|---|---|---|
| 6,612,490 B1 | 9/2003 | Herrendoerfer et al. | |
| 7,043,493 B2 | 5/2006 | Guthery | |
| 9,891,986 B2* | 2/2018 | Sharma | G06F 11/1016 |
| 9,996,378 B2* | 6/2018 | North | G06F 11/0793 |
| 2003/0212710 A1* | 11/2003 | Guy | G06F 17/30867 |
| 2018/0089434 A1* | 3/2018 | Sibert | H04L 63/107 |

OTHER PUBLICATIONS

Hubbers, E., et al., "Tearing Java Cards", In proceedings, E-Smart, Jan. 1, 2006, 21 pages.

Sabaties, D., et al., "The Use of the B Formal Method for the Design and the Validation of the Transaction Mechanism for Smart Card Applications", Formal Methods in System Design, Dec. 1, 2000, 30 pages.

* cited by examiner

INTEGRITY OF TRANSACTIONAL MEMORY OF CARD COMPUTING DEVICES IN CASE OF CARD TEAR EVENTS

BACKGROUND

Card computing devices may provide, authentication, data storage and application processing in a variety of systems from mobile phones to automated teller machines and drivers licenses. Card computing devices may incur a card tear event at any time, when they are removed from a reading terminal or are moved away from a contactless reader. To maintain consistency in the presence of card tear events, there may be a mechanism to support atomic transactions, where a group of operations is either executed completely or reverts to the state prior to beginning the group of operations.

A transaction management system typically uses a dedicated memory region to store information about the performed operations that may be used to revert changes when transactions are explicitly or implicitly aborted. When a transaction is aborted due to a card tear event, the card computing device may lose access to a power source. When power is reconnected, the card computing device may attempt to revert the operations performed during the incomplete transaction. However, it is necessary to ensure that the memory (e.g., an electrically erasable programmable read-only memory, or EEPROM) of the card computing device has not been tampered with in an attempt to modify the memory region containing transaction data. Such modifications could permit an attacker to cause the card computing device to perform some unintended operations, such as modifying or leaking sensitive data.

To address this security risk, card computing devices may use some kind of verification to protect the transaction data. One method is checksum verification, where transactional memory contents are tracked with a checksum. After a power reset, the card computing device may verify the checksum and revert the operations performed during the incomplete transaction.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including copying transaction rollback data to a buffer in a first memory. The transaction rollback data includes data used to restore a heap in a second memory of a card computing device to a first state prior to initiating a transaction on the card computing device. The method further includes calculating a checksum for the transaction rollback data, and storing the calculated checksum and a checksum pointer in the first memory. The checksum pointer refers to a last valid location in a transactional memory region of the second memory for which the checksum is calculated, as the transaction rollback data is written to the first memory. The method further includes writing, to the transactional memory region, the transaction rollback data from the buffer and the checksum and the checksum pointer from the first memory, and performing at least part of the transaction by writing new transaction data to the heap. The transaction rollback data is useable to restore the heap to the first state if the transaction was not completed, upon reconnection of the card computing device after determining that a card tear event has occurred. The card tear event includes a disconnection of the card computing device from a card computing device reader.

In general, in one aspect, one or more embodiments relate to a card computing device including a processor, a first memory, a second memory, and a third memory including instructions that, when executed by the processor, cause the processor to copy transaction rollback data to a buffer in the first memory. The transaction rollback data includes data used to restore a heap in the second memory to a first state prior to initiating a transaction on the card computing device. The instructions further include calculating a checksum for the transaction rollback data, and storing the calculated checksum and a checksum pointer in the first memory. The checksum pointer refers to a last valid location in a transactional memory region of the second memory for which the checksum is calculated, as the transaction rollback data is written to the first memory. The instructions further include writing, to the transactional memory region, the transaction rollback data from the buffer and the checksum and the checksum pointer from the first memory, and performing at least part of the transaction by writing new transaction data to the heap. The transaction rollback data is useable to restore the heap to the first state if the transaction was not completed, upon reconnection of the card computing device after determining that a card tear event has occurred. The card tear event includes a disconnection of the card computing device from a card computing device reader.

In general, in one aspect, one or more embodiments of the invention relate to a non-transitory computer readable medium including instructions that, when executed by a processor, perform a method including copying transaction rollback data to a buffer in a first memory. The transaction rollback data includes data used to restore a heap in a second memory of a card computing device to a first state prior to initiating a transaction on the card computing device. The method further includes calculating a checksum for the transaction rollback data, and storing the calculated checksum and a checksum pointer in the first memory. The checksum pointer refers to a last valid location in a transactional memory region of the second memory for which the checksum is calculated, as the transaction rollback data is written to the first memory. The method further includes writing, to the transactional memory region, the transaction rollback data from the buffer and the checksum and the checksum pointer from the first memory, and performing at least part of the transaction by writing new transaction data to the heap. The transaction rollback data is useable to restore the heap to the first state if the transaction was not completed, upon reconnection of the card computing device after determining that a card tear event has occurred. The card tear event includes a disconnection of the card computing device from a card computing device reader.

Other aspects will be apparent from the following description and the appended claims.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the disclosure. However, it will be apparent to one of ordinary skill in the art that the present disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments disclosed herein relate to a method, system and non-transitory computer readable medium for providing integrity of a transactional memory region in a card computing device when a card tear event occurs. A first (e.g., volatile) memory may be used to store transaction-related information for each operation in a transaction. Performing the transaction may include writing the transaction-related information from the first memory to a second (e.g., persistent) memory. The transaction-related information may be written to the second memory in two phases: initially, transaction rollback data (e.g., data that may be used to undo the transaction) may be written to the transactional memory region of the second memory, then new transaction data (e.g., data that may be used to perform the operations in the transaction) may be written to a heap in the second memory. The transaction-related information may also include a checksum and checksum pointer that may be used to verify the integrity of the transactional memory region (e.g., in case there has been tampering in conjunction with a card tear event). The checksum may apply to the transactional memory region, and the checksum pointer may indicate the scope of the checksum (i.e., the last valid location in the transactional memory region for which the checksum was calculated).

A card tear event may potentially place the transactional memory region into an inconsistent state. The card computing device may be restored to a consistent state by rolling back, once the integrity of the transactional memory region is verified, an incomplete transaction, regardless of when the card tear event occurred, even if the card tear event occurred between writing the checksum and writing the transaction rollback data to the second memory. The restoration operation exploits a method that may update the pages of the second memory in a specific order, to ensure that the page including the checksum and the checksum pointer is written last.

Figure 1:
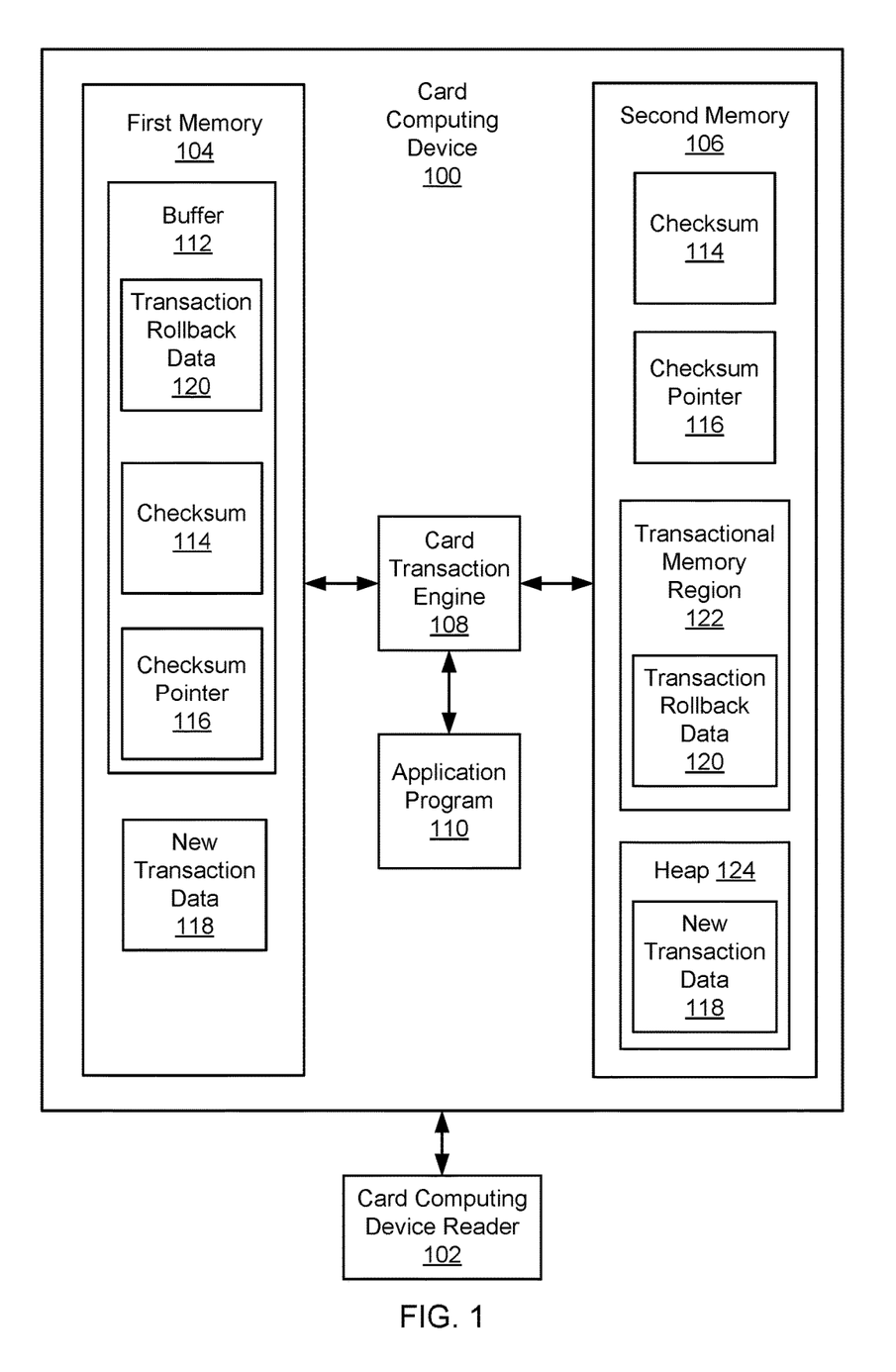
FIG. 1 shows a system in accordance with one or more embodiments disclosed herein.

FIG. 1 shows a system in accordance with one or more embodiments. As shown in FIG. 1, the system includes a card computing device (100) operatively connected to a card computing device reader (102). The card computing device (100) may include a first memory (104), a second memory (106), a card transaction engine (108), and an application program (110). In one or more embodiments, the card computing device (100) may be the computing system (500) described with respect to FIG. 5A and the accompanying description below, or may be the client device (526) described with respect to FIG. 5B.

As described herein, a card computing device (100) may refer to any of various types of pocket-sized cards with embedded integrated circuits, including, but not limited to a smart card, a chip card, an integrated circuit card (ICC), or a universal integrated circuit cards (UICC). A card computing device (100) may be configured for use in various roles in any of various systems, such as to provide identification, authentication, data storage and/or application processing. In various embodiments, card computing devices may include (but not be limited to) credit cards, automated teller machine (ATM) cards, mobile phone subscriber identity module (SIM) cards, drivers licenses, authorization cards for pay television, pre-payment cards, high-security identification cards, access control cards and telephone call payment cards. In additional a card computing device may be configured for use as an electronic wallet, such as by recording and managing one or more financial accounts.

In one or more embodiments, the card computing device (100) may be configured to communicate with the card computing device reader (102) via any of various card-reading mechanisms, devices and/or interfaces. The card computing device (100) may lack its own power source, in which case power may be supplied by the card computing device reader (102). In one or more embodiments, the card computing device (100) may be embedded in the card computing device reader (102) (e.g., the card computing device reader (102) may be a terminal). For example, in some embodiments, card computing device (100) may include one or more contact pads that may be used as a communications medium between the card computing device (100) and a host or terminal for the card computing device (100). In other embodiments, a card computing device (100) may be a contactless card computing device (100) configured to communicate with a terminal via radio waves, such as via blue tooth, near field communications link, radio-frequency (RF) induction, etc. Furthermore, the communications between the card computing device (100) and the card computing device reader (102) may be by wired connection, such as some form of bus (e.g. USB).

Continuing with FIG. 1, in one or more embodiments, the first memory (104) may be the non-persistent storage (504) described with respect to FIG. 5A and the accompanying description below. In one or more embodiments, the second memory (106) may be the persistent storage (506) (e.g., an EEPROM) described with respect to FIG. 5A and the accompanying description below. In one or more embodiments, both the first memory (104) and the second memory (106) may be the same type of storage. For example, both the first memory (104) and the second memory (106) may be the persistent storage (506) (e.g., an EEPROM) described with respect to FIG. 5A and the accompanying description below. The first memory (104) may be used to store transaction-related information relating to transaction processing operations performed by the card transaction engine (108). The transaction-related information may include a checksum (114), a checksum pointer (116), new transaction data (118) and transaction rollback data (120).

In one or more embodiments, a transaction is a group of operations that is either performed completely or not at all, in order to maintain a system in a consistent state. That is, the transaction succeeds or fails as a complete unit. For example, a financial transaction may consist of debit operation that subtracts a value from one account and a credit operation that adds the value to a second account, where either both operations are performed or neither operation is performed. That is, if the transaction is interrupted after performing either the debit or credit operation, then the entire transaction is undone (i.e., rolled back). In one or more embodiments, a transaction may be initiated by the card transaction engine (108) at the request of an application program (110).

Continuing with FIG. 1, in one or more embodiments, the transaction-related information in the first memory (104) may be updated for each operation in a transaction. That is, the checksum (114), the checksum pointer (116), new transaction data (118) and transaction rollback data (120) may be updated each time an operation in the transaction is processed. Similarly, the transaction-related information in the second memory (106) may be updated for each operation in the transaction. That is, the checksum (114), the checksum pointer (116), new transaction data (118) and transaction rollback data (120) may be written to the second memory (106) each time an operation in the transaction is processed.

In one or more embodiments, the first memory (104) may include a buffer (112) and new transaction data (118). The buffer (112) may be a temporary buffer that includes transaction rollback data (120), and a cell for a checksum (114) and a checksum pointer (116).

In one or more embodiments, the second memory (106) may include a checksum (114), a checksum pointer (116), a transactional memory region (122) and a heap (124). The transactional memory region (122) may include transaction rollback data (120). In one or more embodiments, the heap (124) may be an area of memory used for dynamic (e.g., runtime) memory allocation, such that blocks of memory may be allocated and freed in an arbitrary order. For example, the heap (124) may store objects and arrays dynamically allocated by an application program (110). In one or more embodiments, the second memory (106) may be divided into pages such that each page may be written to atomically (i.e., a group of updates to a page either occur completely or the page is not modified at all).

In one or more embodiments, new transaction data (118) may include data to be written during the transaction (e.g., a new value of a persistent variable or array element plus additional data such as the location in the heap (124) to be written). In one or more embodiments, transaction rollback data (120) may include data used to restore a previous state (e.g., a state existing prior to initiating the transaction). For example, transaction rollback data (120) may include a previous value of a variable or array element plus additional data such as the location in the heap (124) of the data to be restored. In one or more embodiments, transaction rollback data (120) may be flushed from the transactional memory region (122) once the corresponding transaction has been committed (e.g., once the heap (124) has been updated with the new transaction data (118) corresponding to the transaction). In one or more embodiments, the transaction rollback data (120) may be flushed after a transaction is rolled back (i.e., undone) using the transaction rollback data (120). That is, transaction rollback data (120) corresponding to a committed or rolled-back transaction may no longer be needed. Flushing the transaction rollback data (120) from the transactional memory region (122) may leave a placeholder (e.g., a header) in the transactional memory region (122), indicating the location of the transactional memory region (122) in the second memory (106).

Continuing with FIG. 1, the checksum (114) may be a value obtained from a block of data for the purpose of detecting errors that may have been introduced during the transmission or storage of the block of data. Therefore, the checksum (114) may be used to establish the integrity of the block of data (i.e., to establish that the block of data has not been modified after its transmission or storage). In one or more embodiments, the checksum pointer (116) may indicate a last valid location in the transactional memory region (122) in the second memory (106) for which the checksum (114) has been calculated. In one or more embodiments, the checksum (114) and the checksum pointer (116) may be stored at a specific location (e.g., a cell) in the first memory (104), and more specifically, in the buffer (112) of the first memory (104).

In one or more embodiments, the checksum (114) and the checksum pointer (116) may be calculated and updated in the first memory (104) for each operation in a transaction. Similarly, the checksum (114) and the checksum pointer (116) in the second memory (106) may be written for each operation in the transaction. Each operation in the transaction may have associated new transaction data (118) and transaction rollback data (120). For example, if an operation assigns or modifies a value of an array element, then the corresponding new transaction data (118) may include the value of the array element and its storage location on the heap (124), and the corresponding transaction rollback data (120) may include the previous value of the array element and its storage location on the heap (124). That is, each operation in a transaction may be processed into new transaction data (118) that may be used to perform the operation on the heap, as well as transaction rollback data (120) that may be used to undo the operation on the heap (124). Performing the transaction may involve writing new transaction data (118), transaction rollback data (120), the checksum (114) and the checksum pointer (116) to the second memory (106) in a manner that accommodates card tear events.

In one or more embodiments, a checksum page of the second memory (106) may include the checksum (114), the checksum pointer (116), and at least the beginning of the transactional memory region (122). Associating the checksum (114) and the checksum pointer (116) with a specific page in the second memory (106) may permit the card transaction engine (108) to control when the checksum (114) and the checksum pointer (116) are updated in the second memory (106). In one or more embodiments, the transactional memory region (122) may be stored in one or more pages in the second memory (106).

In one or more embodiments, previous versions of the checksum (114) and the checksum pointer (116) may be stored in the second memory (106) (e.g., in the checksum page of the second memory (106)). In one or more embodiments, previous versions of the checksum (114) and the checksum pointer (116) may be used to verify a portion of the transactional memory region (122) (e.g., if the current checksum (114) cannot be verified relative to the checksum pointer (116)).

Continuing with FIG. 1, in one or more embodiments, the card transaction engine (108) may include functionality to write the transaction-related information stored in the first memory (104) to the second memory (106) in a reliable and consistent manner, even in the presence of card tear events. The card transaction engine (108) may be implemented in hardware (i.e., circuitry), software, or any combination thereof. In one or more embodiments, the card transaction engine (108) may include functionality to compute a checksum (114) for a block of data. The checksum (114) may be computed via various functions, including hash functions, randomization functions and cryptographic hash functions. The checksum (114) may be based on the number of set bits (i.e., bits set to "1") in the block of data. In one or more embodiments, the checksum (114) may be based on a block of data in the transactional memory region (122) in the second memory (106), up to a last valid location as indicated by the checksum pointer (116).

In order to reliably write transaction-related information to the second memory (106), the card transaction engine (108) may include functionality to detect and respond to card tear events. In one or more embodiments, a card tear event may be detected when the transactional memory region (122) is non-empty when power is restored to the card computing device (100). That is, the presence of transaction rollback data (120) in the transactional memory region (122) may indicate that a card tear event occurred while processing a transaction (e.g., while writing transaction-related information to the second memory (106)).

The card transaction engine (108) may include functionality to initiate a transaction and to complete (i.e., commit) a transaction. The card transaction engine (108) may also include functionality to rollback (e.g., using transaction rollback data (120)) an incomplete transaction (e.g., in response to detecting a card tear event) that restores the heap (124) to a previous state (e.g., a state existing prior to initiating the rolled back transaction).

The card computing device (100) may be configured to store and execute an application program (110). The application program (110) may be implemented in hardware (i.e., circuitry), software, or any combination thereof. The application program (110) may include functionality to initiate one or more transactions on the card computing device (100) via the card transaction engine (108). In one or more embodiments, the application program (110) may be a collection of source code that may include various software components. That is, the application program (110) may be a collection of computer instructions written in a human-readable programming language. The application program (110) may be transformed by a compiler program into binary machine code. Compiled machine code may then be executed by the card computing device (100) in order to execute the software components generated from the application program (110).

While FIG. 1 shows a configuration of components, other configurations may be used without departing from the scope of embodiments disclosed herein. For example, various components may be combined to create a single component. As another example, the functionality performed by a single component may be performed by two or more components.

Figure 2:
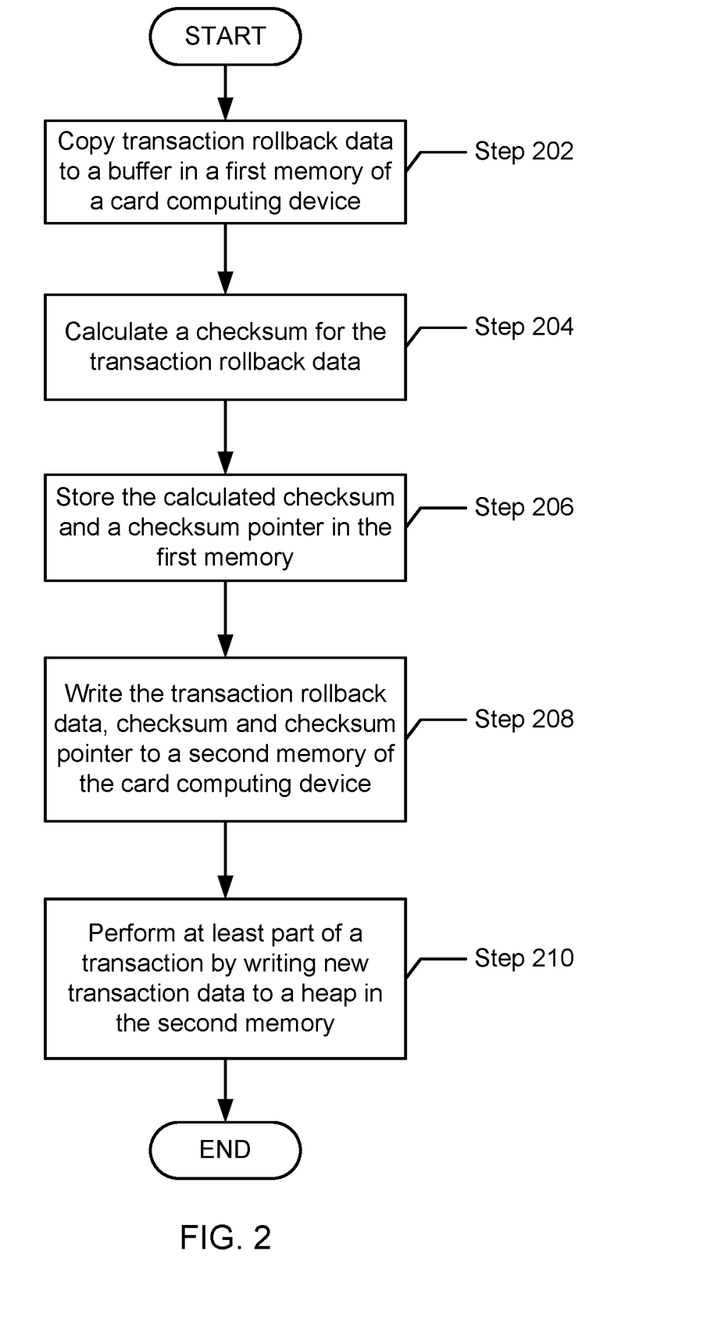
FIG. 2 and FIG. 3 show flowcharts in accordance with one or more embodiments disclosed herein.

FIG. 2 shows a flowchart in accordance with one or more embodiments. The flowchart depicts a process for updating transactional memory during transaction processing. One or more of the steps in FIG. 2 may be performed by the components of the card computing device (100), discussed above in reference to FIG. 1. In one or more embodiments, one or more of the steps shown in FIG. 2 may be omitted, repeated, and/or performed in a different order than the order shown in FIG. 2. Accordingly, the scope of embodiments disclosed herein should not be considered limited to the specific arrangement of steps shown in FIG. 2.

Initially, in Step 202, transaction rollback data is copied to a buffer in a first memory. In one or more embodiments, the first memory may be a RAM or some other type of non-persistent storage. In one or more embodiments, as described above, the first memory may be an EEPROM or some other type of persistent storage (e.g., if there is insufficient RAM memory). In one or more embodiments, transaction rollback data may include data used to restore a heap in a second (e.g., persistent) memory of the card computing device to a first state (e.g., a state existing prior to initiating a transaction). Each operation in a transaction may have corresponding transaction rollback data that may be used to undo the operation on the heap. For example, transaction rollback data may include a previous value of a variable or array element plus additional data such as the location in the heap of the data to be restored. In one or more embodiments, transaction rollback data may be generated for each operation in a transaction, and copied to the buffer.

In Step 204, a checksum is calculated for the transaction rollback data. In one or more embodiments, the checksum may be a value obtained from the transaction rollback data for the purpose of verifying the integrity of the transaction rollback data (e.g., after storing the transaction rollback data in the second memory). The checksum may be computed via various functions, including hash functions, randomization functions and cryptographic hash functions.

In Step 206, the checksum and a checksum pointer are stored in the first memory. In one or more embodiments, the checksum and the checksum pointer may be updated each time additional transaction rollback data (e.g., corresponding to an operation in a transaction) is copied to the buffer. In one or more embodiments, the checksum pointer may represent a last valid location in a transactional memory region in the second memory for which the checksum has been calculated. In one or more embodiments, the checksum and the checksum pointer may be stored in a specific location (e.g., a cell) in the first memory or the buffer in the first memory.

In Step 208, the transaction rollback data from the buffer and the checksum and the checksum pointer from the first memory are written to the transactional memory region in the second memory. As described above, the second memory may be a type of persistent storage (e.g., an EEPROM). In one or more embodiments, the transaction rollback data, the checksum and the checksum pointer are written to the second memory for each operation in a transaction. In one or more embodiments, a checksum page of the second memory may be used to store the checksum, the checksum pointer, and at least the beginning of the transactional memory region. In one or more embodiments, the transactional memory region may be stored in one or more pages in the second memory. In one or more embodiments, the transaction rollback data is written from the buffer of the first memory to the second memory, where the checksum page of the second memory is written last. For example, the transaction rollback data may be written starting from the end of the temporary buffer so that the last page written from the buffer to the second memory may correspond to the checksum page (e.g., to ensure that the checksum and checksum pointer are not updated until all of the transaction rollback data has been written to the transactional memory region in the second memory).

In Step 210, at least part of a transaction is performed by writing new transaction data to the heap. In one or more embodiments, each operation in the transaction may have corresponding new transaction data that may be used to perform the operation on the heap (e.g., to update objects and/or other data with new values). For example, if an operation assigns or modifies a value of an array element, then the corresponding new transaction data may include the value of the array element and its storage location on the heap.

In one or more embodiments, when the transaction is not completed, and upon reconnection of the card computing device after determining that a card tear event has occurred, the transaction rollback data may be used to restore the heap to the first state. The card tear event may disconnect the card computing device from a card computing device reader. This is discussed further in FIG. 3 below.

Figure 3:
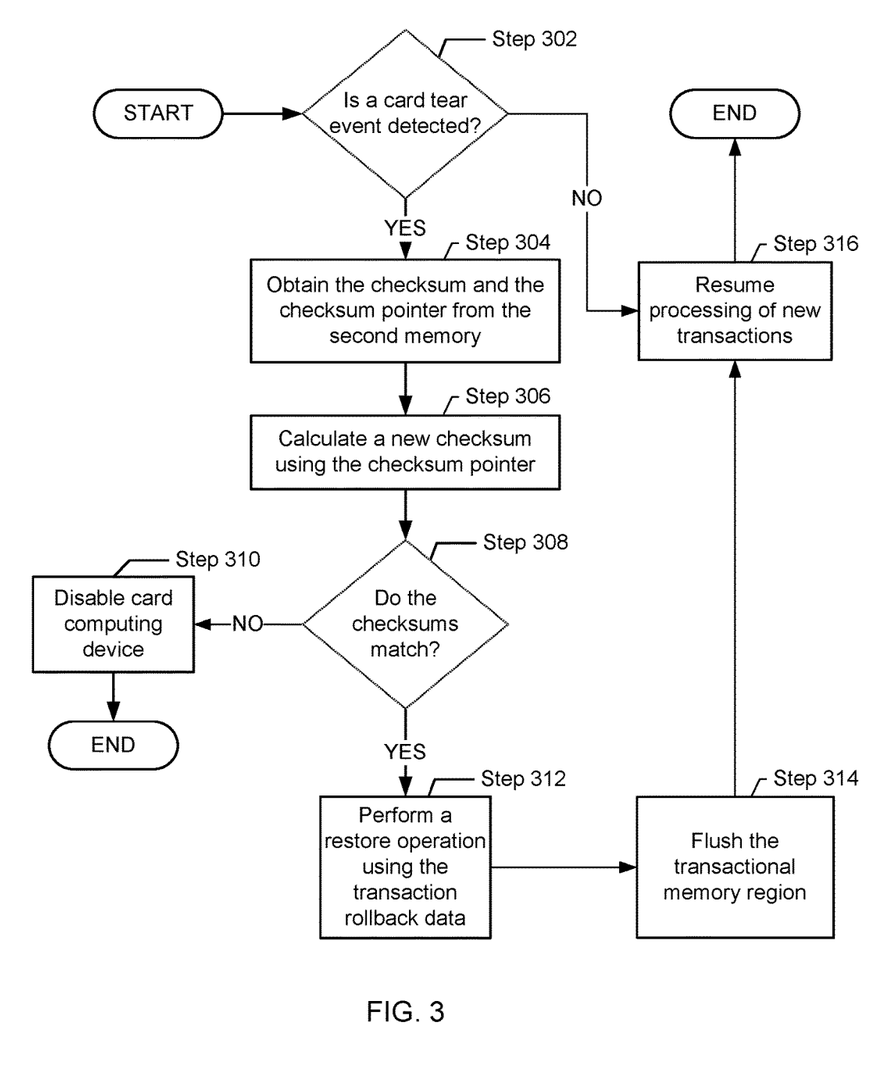

FIG. 3 shows a flowchart in accordance with one or more embodiments. The flowchart depicts a recovery process that checks for a card tear event and may perform a restore operation. One or more of the steps in FIG. 3 may be performed by the components of the card computing device (100), discussed above in reference to FIG. 1. In one or more embodiments, one or more of the steps shown in FIG. 3 may be omitted, repeated, and/or performed in a different order than the order shown in FIG. 3. Accordingly, the scope of embodiments disclosed herein should not be considered limited to the specific arrangement of steps shown in FIG. 3.

Initially, in Step 302, a card tear event is detected. In one or more embodiments, a card tear event is detected when the transactional memory region is non-empty when power is restored to the card computing device. That is, the transactional memory region may be flushed (i.e., emptied) after successfully committing or rolling back a transaction. If transactional memory region has not been flushed (i.e., data exists in the transactional memory region upon powering up the card computing device), the presumption may be that a card tear event occurred after initiating a transaction and before the transaction could either be committed or rolled back.

In one or more embodiments, if the recovery process depicted in FIG. 3 is interrupted due to a second card tear event, then a card tear event will again be detected in Step 302 when power is again restored to the card computing device. To ensure that the recovery process will eventually be completed, the transactional memory region may not be flushed until after a restore operation (e.g., in Step 312 below) is successfully completed.

If no card tear event is detected in Step 302, then there may be no need to perform a card computing device restore operation, and processing of new transactions may be resumed in Step 316. For example, no card tear event may be detected if a transaction was interrupted prior to writing any transaction-related information to the second memory (e.g., Step 208 above had not yet been performed for any operation in the transaction), in which case the transactional memory region would be empty (i.e., devoid of transaction rollback data), and therefore no restore operation would be needed.

When a card tear event is detected, transaction operations are reverted. In Step 304, the checksum and the checksum pointer are obtained from the second memory. The checksum and checksum pointer may be examined to determine whether data in the transactional memory region has been corrupted, which may indicate possible tampering.

In Step 306, a new checksum is calculated using the checksum pointer obtained above in Step 304. That is, the checksum pointer may be used to determine the last valid location in the transactional memory region for which the new checksum will be calculated.

In Step 308, it is determined whether the new checksum matches the checksum obtained from the second memory. That is, when there is more transactional data in the second memory than indicated by the checksum data pointer, for example, either this extra data is corrupt or a card tear event occurred. To exclude the possibility of corrupt data, the data from the beginning of the transactional memory to the address indicated by the checksum data pointer needs to be verified against the checksum value. If the two checksums match, then the transactional memory region has retained its integrity. Therefore, it may be assumed that there has been no tampering, and the incomplete transaction may be safely rolled back (in Step 312 below). Thus, the card computing device may be salvaged after a card tear event unless the integrity of the transactional memory region cannot be verified using the checksum and the checksum pointer obtained from the second memory.

If the checksums fail to match, then in Step 310 the card computing device is disabled because the transactional memory region has been corrupted, possibly with malicious intent.

When the checksums match, in Step 312, a restore operation is performed using the transaction rollback data. The restore operation may roll back (i.e., undo) the effect of the incomplete transaction on the heap.

In Step 314, the transactional memory region is flushed. That is, after the restore operation is performed, the transaction rollback data in the transactional memory region may no longer be needed.

In Step 316, processing of new transactions is resumed now that the inconsistent state of the heap has been corrected by rolling back the incomplete transaction.

The methods described herein, based on preserving the integrity of transaction-related information in a card computing device in the presence of card tear events, may also be used to preserve the integrity of transaction-related information stored in other types of computing devices in the presence of other types of events. In other embodiments, the methods described herein may be similarly used to provide integrity of transaction-related information when transaction processing may be interrupted by various types of hardware or software failures (including malicious attacks), which may leave the computing device in an inconsistent state.

The following example is for explanatory purposes only and not intended to limit the scope of embodiments disclosed herein. FIG. 4A, FIG. 4B, FIG. 4C, and FIG. 4D show the state of the second memory under different scenarios, illustrating the impact of a card tear event at various points during the processing of a transaction.

Figure 4A:
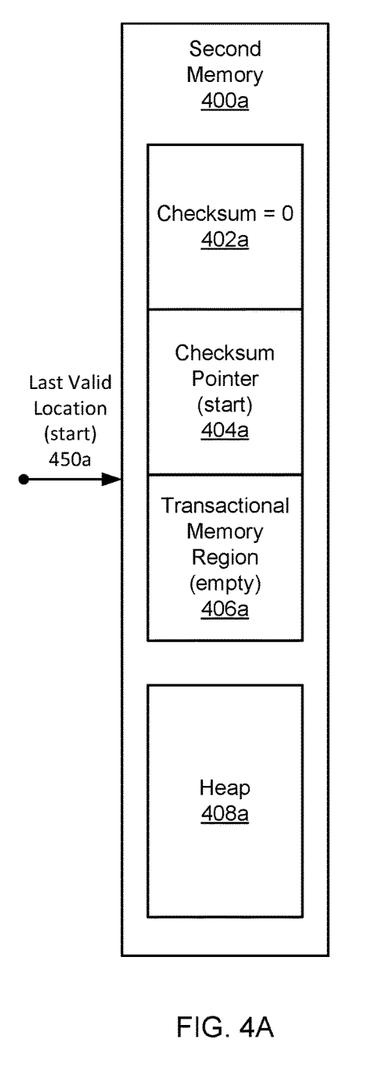
FIG. 4A, FIG. 4B, FIG. 4C and FIG. 4D show examples in accordance with one or more embodiments disclosed herein.

FIG. 4A shows an initial state of the second memory (400a) prior to initiating a transaction. The second memory (400a) includes a checksum (402a), checksum pointer (404a), transactional memory region (406a), and heap (408a). Initially, the transactional memory region (406a) is empty and the checksum (402a) is zero. The checksum pointer (404a) refers to the starting location, also shown as the last valid location (450a), of the transactional memory region (406a).

Figure 4B:
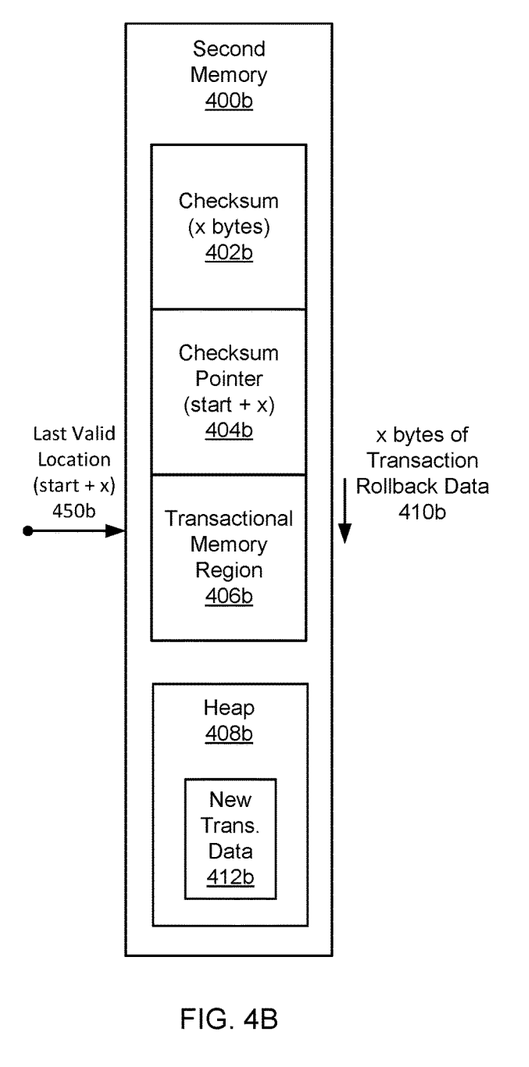

FIG. 4B shows the state of the second memory (400b) after one or more operations in a transaction have been successfully performed and transaction-related information corresponding to these operations has been written to the second memory (400b). The transactional memory region (406b) now contains x bytes of transaction rollback data (410b) (e.g., written during Step 208 in FIG. 2). The checksum (402b) is based on the x bytes of transaction rollback data (410b). The checksum pointer (404b) now refers to the starting location of the transactional memory region (406b) offset by x bytes (shown as the last valid location (450b)). The heap (408b) now contains new transaction data (412b) (e.g., written during Step 210 in FIG. 2) corresponding to the successfully performed operations of the transaction.

If a card tear event occurs while processing an operation in the transaction prior to performing Step 208 in FIG. 2 for that operation, then no updates to the second memory (400b) would be performed corresponding to the interrupted operation. That is, no transaction rollback data (410b) and no new transaction data (412b) would have been written to the second memory (400b) for the interrupted operation, nor would the checksum (402b) and checksum pointer (404b) be updated for the interrupted operation. Therefore, when the card computing device initiates recovery when powering up (e.g., via the recovery process of FIG. 3), the checksum (402b) would be based on the x bytes of transaction rollback data (410b) for the already performed operations of the transaction. The already performed operations in the transaction would be rolled back using the transaction rollback data (410b), provided the checksum (402b) and the checksum pointer (404b) can verify the integrity of the transactional memory region (406b). The integrity of the transactional memory region (406b) may be verified by comparing the checksum (402b) from the second memory (400b) to a new checksum calculated using the checksum pointer (404b) from the second memory (400b) (e.g., in Step 308 of FIG. 3).

Figure 4C:
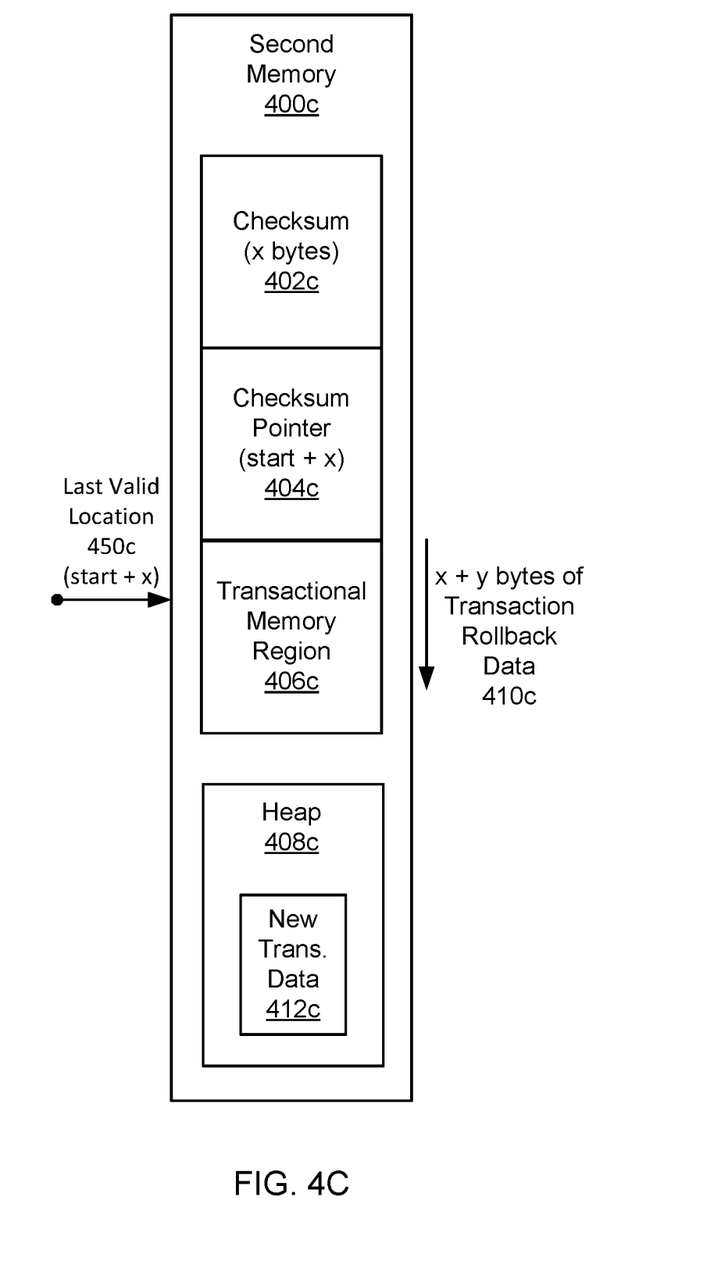

FIG. 4C shows the state of the second memory (400c) after an operation in the transaction has been interrupted by a card tear event while performing Step 208 in FIG. 2. The transactional memory region (406c) now contains an additional y bytes of transaction rollback data (410c) corresponding to the interrupted operation (e.g., written during Step 208 in FIG. 2 before the operation was interrupted by the card tear event). However, since Step 208 was not completed, the checksum (402c) was not updated to reflect the additional y bytes of transaction rollback data (410c). The checksum (402c) and checksum pointer (404c) were not updated in the second memory (400c) due to the order in which pages of the second memory (400c) are written. That is, the checksum page in the second memory (400c) storing the checksum (402c) and the checksum pointer (404c) was not written, because the checksum page is written last when Step 208 of FIG. 2 is performed, and Step 208 was not completed due to the card tear event.

The checksum pointer (404c) therefore still refers to the starting location of the transactional memory region (406c) offset by x bytes (shown as the last valid location (450c)). The heap (408c) does not contain any new transaction data (412c) corresponding to the interrupted operation (e.g., since Step 210 in FIG. 2 was not reached for the interrupted operation). However, the heap (408c) contains new transaction data (412c) corresponding to the successfully performed operations of the transaction.

Upon initiating recovery (e.g., via the recovery process of FIG. 3), the checksum (402c) would still be based on the x bytes of transaction rollback data bounded by the last valid location (450c). The already performed operations in the transaction may be rolled back using the x bytes of transaction rollback data bounded by the last valid location (450c). That is, the additional y bytes of transaction rollback data are not needed because the additional y bytes of transaction rollback data correspond to the interrupted operation, and the interrupted operation was never able to write its new transaction data (412c) to the heap (408c), so there is no need to roll back the interrupted operation.

Figure 4D:
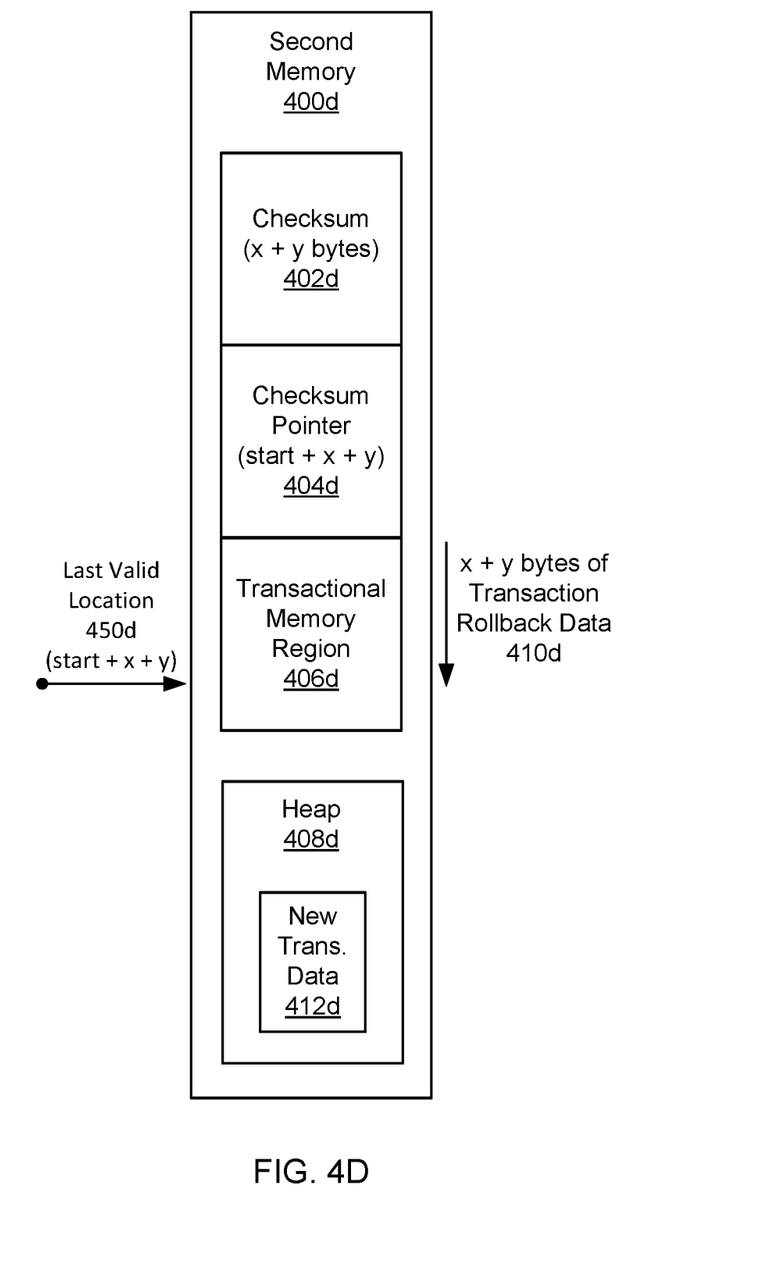

In FIG. 4D, consider a scenario where the operation is interrupted by a card tear event after performing Step 208 in FIG. 2, in contrast to FIG. 4C, where the operation is interrupted by a card tear event while performing Step 208 in FIG. 2. In FIG. 4D, as in FIG. 4C, the transactional memory region (406d) of the second memory (400d) contains x+y bytes of transaction rollback data (410d) corresponding to the operations in the transaction for which Step 208 was completed, including the operation interrupted by the card tear event. Therefore, in FIG. 4D, the checksum (402d) has been updated to reflect the x+y bytes of transaction rollback data (410d). The checksum pointer (404d) has been updated to refer to the last valid location (450d) corresponding to the x+y bytes of transaction rollback data (410d).

In the scenario represented by FIG. 4D, Step 210 may or may not have been performed for the interrupted operation, depending on the timing of the card tear event. Therefore, the heap (408d) may or may not contain new transaction data (412d) corresponding to the interrupted operation. Regardless, upon initiating recovery (FIG. 3), after verifying the integrity of the transactional memory region (406d), the x+y bytes of transaction rollback data (410d) present in the transactional memory region (406d) may be used to roll back the operations in the incomplete transaction.

Embodiments disclosed herein allow for securely saving cards that experienced card tear events in the time between writing data and updating the checksum. In addition, performance improvements are possible with embodiments disclosed herein because usually writing the data and checksum are two separate operations each requiring time consuming EEPROM writes. Further, as a card tear event can happen at any moment, embodiments disclosed herein ensure that EEPROM page writes are atomic, i.e. if some of the EEPROM pages were updated, they were each updated completely.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, or any other memory that is non-transitory. Specifically, the software instructions may correspond to computer readable program code that, when executed by a processor(s), is configured to perform one or more embodiments disclosed herein.

Figure 5A:
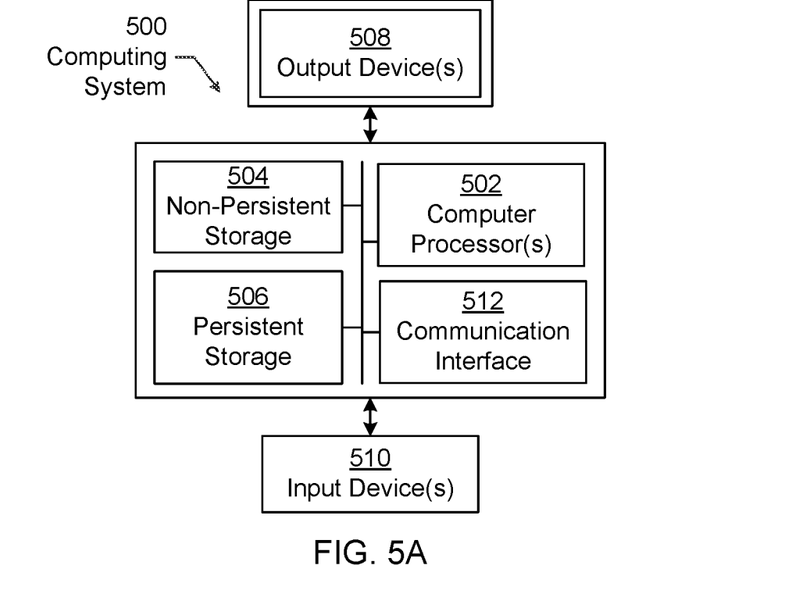
FIG. 5A and FIG. 5B show computing systems in accordance with one or more embodiments disclosed herein.
Figure 5B:
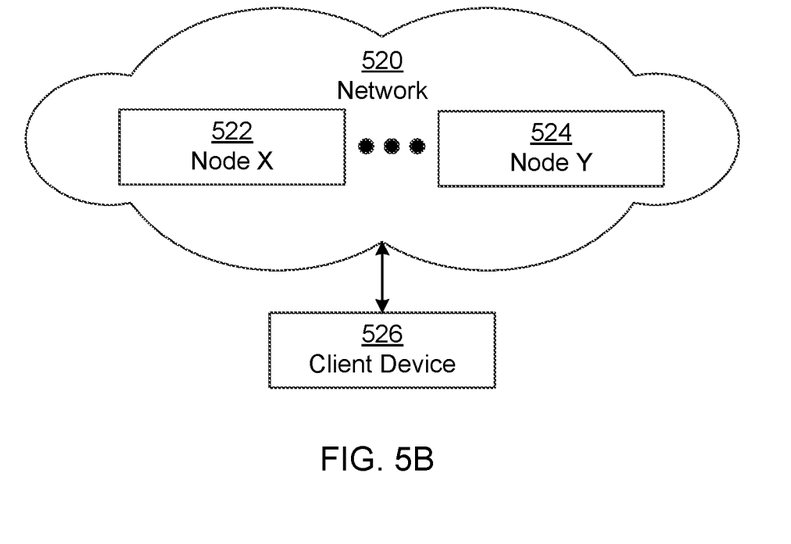

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the disclosure has been described with respect to a limited number of embodiments, those skilled in the art, having benefit of this disclosure, will appreciate that other embodiments can be devised which do not depart from the scope as disclosed herein. Accordingly, the scope disclosed herein should be limited only by the attached claims.

What is claimed is:

1. A method, comprising:
    copying transaction rollback data to a buffer in a first memory, the transaction rollback data comprising data used to restore a heap in a second memory of a card computing device to a first state prior to initiating a transaction on the card computing device;
    calculating a checksum for the transaction rollback data;
    storing the calculated checksum and a checksum pointer in the first memory, wherein the checksum pointer refers to a last valid location in a transactional memory region of the second memory for which the checksum is calculated, as the transaction rollback data is written to the first memory;
    writing, to the transactional memory region, the transaction rollback data from the buffer and the checksum and the checksum pointer from the first memory; and
    performing at least part of the transaction by writing new transaction data to the heap, wherein the transaction rollback data is useable to restore the heap to the first state if the transaction was not completed, upon reconnection of the card computing device after determining that a card tear event has occurred, wherein the card tear event comprises a disconnection of the card computing device from a card computing device reader.

2. The method of claim 1,
    wherein the second memory is divided into a plurality of pages, the plurality of pages comprising a checksum page,
    wherein the checksum page stores the checksum, the checksum pointer and at least the beginning of the transactional memory region, and
    wherein writing to the transactional memory region comprises writing to one or more pages of the plurality of pages, the one or more pages comprising the checksum page, wherein the checksum page is written last.

3. The method of claim 1, wherein the transaction rollback data is written from the buffer to the transactional memory region starting from the end of the buffer.

4. The method of claim 1, further comprising:
verifying the transaction rollback data in the transactional memory region by obtaining the checksum and the checksum pointer from the second memory, calculating a new checksum for the transactional memory region using the checksum pointer, and comparing the new checksum to the checksum from the second memory; and
performing, based on the verification, a restore operation using the transaction rollback data to restore the heap to the first state.

5. The method of claim 4, further comprising flushing the transactional memory region after performing the restore operation.

6. The method of claim 1, wherein determining that the card tear event has occurred is based, in part, on detecting that the transactional memory region is non-empty.

7. A card computing device, comprising:
a hardware processor;
a first memory;
a second memory; and
a third memory comprising instructions that, when executed by the hardware processor, cause the hardware processor to:
copy transaction rollback data to a buffer in the first memory, the transaction rollback data comprising data used to restore a heap in the second memory to a first state prior to initiating a transaction on the card computing device;
calculate a checksum for the transaction rollback data;
storing the calculated checksum and a checksum pointer in the first memory, wherein the checksum pointer refers to a last valid location in a transactional memory region of the second memory for which the checksum is calculated, as the transaction rollback data is written to the first memory;
write, to the transactional memory region, the transaction rollback data from the buffer and the checksum and the checksum pointer from the first memory; and
perform at least part of the transaction by writing new transaction data to the heap, wherein the transaction rollback data is useable to restore the heap to the first state if the transaction was not completed, upon reconnection of the card computing device after determining that a card tear event has occurred, wherein the card tear event comprises a disconnection of the card computing device from a card computing device reader.

8. The system of claim 7,
wherein the second memory is divided into a plurality of pages, the plurality of pages comprising a checksum page,
wherein the checksum page stores the checksum, the checksum pointer and at least the beginning of the transactional memory region, and
wherein writing to the transactional memory region comprises writing to one or more pages of the plurality of pages, the one or more pages comprising the checksum page, wherein the checksum page is written last.

9. The system of claim 7, wherein the transaction rollback data is written from the buffer to the transactional memory region starting from the end of the buffer.

10. The system of claim 7, wherein the third memory further comprises instructions that, when executed by the hardware processor, cause the hardware processor to:
verify the transaction rollback data in the transactional memory region by obtaining the checksum and the checksum pointer from the second memory, calculating a new checksum for the transactional memory region using the checksum pointer, and comparing the new checksum to the checksum from the second memory; and
perform, based on the verification, a restore operation using the transaction rollback data to restore the heap to the first state.

11. The system of claim 10, wherein the third memory further comprises instructions that, when executed by the hardware processor, cause the hardware processor to flush the transactional memory region after performing the restore operation.

12. The system of claim 7, wherein determining that the card tear event has occurred is based, in part, on detecting that the transactional memory region is non-empty.

13. A non-transitory computer readable medium comprising instructions that, when executed by a processor, perform a method comprising:
copying transaction rollback data to a buffer in a first memory, the transaction rollback data comprising data used to restore a heap in a second memory of a card computing device to a first state prior to initiating a transaction on the card computing device;
calculating a checksum for the transaction rollback data;
storing the calculated checksum and a checksum pointer in the first memory, wherein the checksum pointer refers to a last valid location in a transactional memory region of the second memory for which the checksum is calculated, as the transaction rollback data is written to the first memory;
writing, to the transactional memory region, the transaction rollback data from the buffer and the checksum and the checksum pointer from the first memory; and
performing at least part of the transaction by writing new transaction data to the heap,
wherein the transaction rollback data is useable to restore the heap to the first state if the transaction was not completed, upon reconnection of the card computing device after determining that a card tear event has occurred, wherein the card tear event comprises a disconnection of the card computing device from a card computing device reader.

14. The non-transitory computer readable medium of claim 13,
wherein the second memory is divided into a plurality of pages, the plurality of pages comprising a checksum page,
wherein the checksum page stores the checksum, the checksum pointer and at least the beginning of the transactional memory region, and
wherein writing to the transactional memory region comprises writing to one or more pages of the plurality of pages, the one or more pages comprising the checksum page, wherein the checksum page is written last.

15. The non-transitory computer readable medium of claim 13, wherein the transaction rollback data is written from the buffer to the transactional memory region starting from the end of the buffer.

16. The non-transitory computer readable medium of claim 13, wherein the method further comprises:

verifying the transaction rollback data in the transactional memory region by obtaining the checksum and the checksum pointer from the second memory, calculating a new checksum for the transactional memory region using the checksum pointer, and comparing the new checksum to the checksum from the second memory; and performing, based on the verification, a restore operation using the transaction rollback data to restore the heap to the first state.

17. The non-transitory computer readable medium of claim 16, wherein the method further comprises flushing the transactional memory region after performing the restore operation.

18. The non-transitory computer readable medium of claim 13, wherein determining that the card tear event has occurred is based, in part, on detecting that the transactional memory region is non-empty.

* * * * *

UNITED STATES PATENT AND TRADEMARK OFFICE
CERTIFICATE OF CORRECTION

PATENT NO. : 10,146,644 B2
APPLICATION NO. : 15/183830
DATED : December 4, 2018
INVENTOR(S) : Mikhail Aleksandrovich Smirnov et al.

Page 1 of 1

It is certified that error appears in the above-identified patent and that said Letters Patent is hereby corrected as shown below:

In the Claims

In Column 15, Line 54, delete "system" and insert -- method --

In Column 15, Line 65, delete "system" and insert -- method --

In Column 16, Line 1, delete "system" and insert -- method --

In Column 16, Line 14, delete "system" and insert -- method --

In Column 16, Line 19, delete "system" and insert -- method --

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*